United States Patent
SanGiovanni

(10) Patent No.: US 7,139,596 B2
(45) Date of Patent: *Nov. 21, 2006

(54) MODULAR TWO-BODY DESIGN FOR INTEGRATION OF MOBILE COMPUTING DEVICE FEATURES WITH A WIRELESS COMMUNICATION DEVICE

(75) Inventor: John SanGiovanni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 138 days.

This patent is subject to a terminal disclaimer.

(21) Appl. No.: 11/021,133

(22) Filed: Dec. 22, 2004

(65) Prior Publication Data

US 2005/0107138 A1   May 19, 2005

Related U.S. Application Data

(63) Continuation of application No. 09/773,455, filed on Jan. 31, 2001, now Pat. No. 6,850,784.

(51) Int. Cl.
*H04M 1/00* (2006.01)
*H04M 9/00* (2006.01)

(52) U.S. Cl. .............................. 455/575.1; 455/556.1; 455/557; 455/575.3; 455/575.4; 379/433.12; 379/433.13

(58) Field of Classification Search ............. 455/556.1, 455/556.2, 575.1, 575.3, 575.4, 575.8; 379/433.04, 379/433.07, 433.12

See application file for complete search history.

(56) References Cited

U.S. PATENT DOCUMENTS 5,485,517 A   1/1996 Gray (Continued)

OTHER PUBLICATIONS

O'Malley, Chris, "Simonizing the PDA, BYTE: The Magazine of Technology Integration," vol. 19, No. 12, Dec. 1994 (pp.145-146, 148).

(Continued)

*Primary Examiner*—Matthew D. Anderson
*Assistant Examiner*—Yuwen Pan
(74) *Attorney, Agent, or Firm*—Perkins Coie LLP

(57) ABSTRACT

The integrated computing wireless communication device offers the added flexibility of conventional mobile computing devices while offering optional portability of the wireless communication device. The integrated computing wireless communication device includes an information input/output device connected to a wireless communication device at a universal joint. The information input/output device includes a display and at least one input device. The wireless communication device includes a processor and at least one separate input device. The processor receives the input and presents an output image on the display. The information input/output device and the wireless communication device are electrically connected by electrical contacts of the universal joint. The universal joint includes a pivot for rotating the information input/output device over a vertical axis and a swivel for rotating the information input/output device over a horizontal axis. The universal joint includes mechanical latch positions for latching the integrated computing wireless communication device into a variety of positions for inputting information into the device. The mechanical latch facilitates single-hand operation of the integrated computing wireless communication device by latching the device into angles of rotation of the pivot and the swivel. The information input/output device and the wireless communication device detach at the universal joint so that the wireless communication device may be used independently of the information input/output device. In an alternative embodiment, the information input/output device might be replaced by a mobile computing device which, when separated, may be used independently of the wireless communication device.

20 Claims, 5 Drawing Sheets

U.S. PATENT DOCUMENTS

| | | | |
|---|---|---|---|
| 5,898,774 | A | 4/1999 | Shindo |
| 6,073,033 | A | 6/2000 | Campo |
| 6,240,302 | B1 | 5/2001 | Harrison |
| 6,549,789 | B1 | 4/2003 | Kfoury |
| 6,633,759 | B1 | 10/2003 | Kobayashi |

OTHER PUBLICATIONS

Dack, David et al., Use of 115 kb/s Infra-Red Interface for Mobile Multimedia, Hewlett-Packard Laboratories, Bristol, U.K., IOS Press, Amsterdam, 1994 (pp. 980-985).

Thompson, Tom, "Apple's Improved MessagePad, BYTE: The Magazine of Technology Integration," vol. 20, No. 5, May 1995 (p.131).

Kruger, P., "Growing Pains [GSM and Internet Technologies]," Communications International, U.K., vol. 24, No. 5, May 1997 (pp. 49-50, 52).

Brown, Raymond and Smith, W.R., "Embedded Passive Functions for RF and Mixed-Signal Circuits," IEEE, New York, New York, Proceedings 1997 International Conference on Multichip Modules, 1997 (pp. 351-356).

Ketola, Pekka et al., "Coping with Consistency Under Multiple Design Constraints: The Case of Nokia 9000 WWW Browser," London, U.K., Personal Technologies Journal, vol. 4, No. 2, 2000 (pp. 86-95).

Harvey, Fiona, "The Internet in Your Hands, Scientific American" Oct. 2000 (pp. 40-45).

MODULAR TWO-BODY DESIGN FOR INTEGRATION OF MOBILE COMPUTING DEVICE FEATURES WITH A WIRELESS COMMUNICATION DEVICE

CROSS-REFERENCE TO RELATED APPLICATION(S)

This application is a continuation of U.S. patent application Ser. No. 09/773,455, filed Jan. 31, 2001 now U.S. Pat. No. 6,850,784 entitled "MODULAR TWO-BODY DESIGN FOR INTEGRATION OF MOBILE COMPUTING DEVICE FEATURES WITH A WIRELESS COMMUNICATION DEVICE," which application is hereby incorporated by reference in its entirety.

TECHNICAL FIELD

The invention relates generally to the integration of mobile computing features with a wireless communication device. More particularly, the invention relates to a two-body modular design connecting an information input/output device to a wireless communication device.

BACKGROUND OF THE INVENTION

Despite tremendous diversity of cellular phones and mobile computing devices, in recent years there has been little innovation in the basic physical design of these devices. As the mobile user demands more functionality on the move, these two products are beginning to converge. Accordingly, demand is increasing for a single device that offers the combined functionality of a mobile computing device and a cellular phone.

With the demand for an integrated mobile computing/cellular phone device rapidly growing, designers must address two integral concerns surrounding the market. First, it is optimal to build an integrated mobile computing/cellular phone device that incorporates the flexibility of modern mobile computing features. Cellular phones with integrated mobile computing features will be larger and heavier than the conventional, increasingly smaller cellular phone. Second, it is important to build an integrated mobile computing/cellular phone device while designing towards the popular portability of modern cellular phones.

Several designs for an integrated mobile computing/cellular phone device have been introduced; however, none have been successful at addressing both of the aforementioned concerns. In particular, these designs are associated with problems related to bulkiness, non-portability, and inefficient battery life. The conventional design integrates the mobile computing device and the cellular phone into a single physical device. This design results in a bulky device, typically the size of the mobile computing device of the design. Further, the cellular phone of this design is non-portable, meaning that the cellular phone may not be detached and used separate from the mobile computing device.

Bluetooth™ technology has led to the implementation of another design. Bluetooth™ is a new wireless technology offering an alternative to physically integrating the mobile computing device and the cellular phone into a single body. Bluetooth™ technology was developed by a Bluetooth™ Special Interest Group consisting of a number of companies. Bluetooth™ offers a high-speed wireless link between all devices in a user's personal space up to 30 feet, commonly referred to as a personal area network (PAN). While Bluetooth™ technology is one attempt to solve the aforementioned concerns, many users still demand the integrated device in a single-body design. In order to use Bluetooth™, a user must either remain within the PAN or carry a collection of special devices with them while out of the home or office. Furthermore, the wireless link used in Bluetooth™ technology is much more draining of battery life than a physical electrical connection.

SUMMARY OF THE INVENTION

In accordance with this invention, the above and other problems are solved by an integrated computing wireless communication device. The integrated computing wireless communication device is a modular two-body design for integrating features of a mobile computing device into a wireless communication device. The two-body design includes a wireless communication device and an information input/output device connected by a universal joint. The two-body design allows a user to physically separate the wireless communication device from the information input/output device in instances where only the wireless communication device is needed. Operation of the wireless communication device is not dependent upon the connection between the two devices. By enabling the user to physically detach the wireless communication device from the information input/output device, a user may use the wireless communication device separately without the bulkiness associated with the integrated device.

In one aspect of the invention, the wireless communication device includes an information processing module for implementing the mobile computing features. The integrated computing wireless communication device has a touchpad-based graphical user interface (GUI) to allow one-hand operation of the integrated device. In another aspect of the invention, a stylus-based GUI might be used to control the device. Since physically connected to the wireless communication device, the information input/output device is supplied power through the same electrical connection. The information input/output device is connected to the wireless communication device by a universal joint allowing the information input/output device to pivot 360 degrees and swivel 90 degrees over the wireless communication device. The wireless communication device, which includes a numeric keypad, can also serve as a base for the integrated device in self-standing mode since the universal joint allows for 3-dimensional pivot.

In accordance with other aspects, the present invention relates to an integrated computing wireless communication device for integrating mobile computing features with a wireless communication device. The integrated computing wireless communication device includes an information input/output device connected to a wireless communication device at a universal joint. The universal joint includes mechanical latch positions for latching the integrated computing wireless communication device into a variety of positions for inputting information into the device. In particular, the mechanical latch facilitates single-hand operation of the integrated computing wireless communication device. In order to enable the rotation functionality, the universal joint includes a swivel and a pivot. The information input/output device and the wireless communication device detach at the universal joint so that the wireless communication device may be used independently of the information input/output device.

In an alternative aspect of the invention, the information input/output device is replaced with a mobile computing device, such as a personal data assistant (PDA). The PDA includes a display, an input device, a processor, and a separate battery. The physical electrical connection between the mobile computing device and the wireless communication device allows for battery life optimization since Bluetooth™ technology is only employed while the devices are separated. By using a PDA in place of an information input/output device, the functionality of the PDA is independent of the wireless communication device, therefore allowing a user to selectively carry only one of the devices in instances where only one is needed. In other alternative aspects, the mobile computing device may be any variation of a PDA, such as a handheld personal computer, an electronic organizer, or any device wherein information is input by a user and used by a device to output functionality.

The great utility of the invention is that the integrated computing wireless communication device offers the added flexibility of conventional mobile computing devices while also offering optional portability of the wireless communication device. Specifically, the wireless communication device can be separated from the information input/output device at a universal joint having a swivel and a pivot. By allowing separation of the components, the concerns surrounding the size of the cellular phone are overcome. Additionally, the integrated device includes the added functionality and flexibility of modern mobile computing devices. Other advantages of the integrated computing wireless communication device include such aspects as facilitated one-hand operation, alternative horizontal (landscape) and vertical (portrait) orientations, and a self-standing mode enabling the user to position the display on a flat surface for relatively easy viewing.

These and various other features as well as advantages, which characterize the present invention, will be apparent from a reading of the following detailed description and a review of the associated drawings.

DETAILED DESCRIPTION OF THE INVENTION

Figure 1:
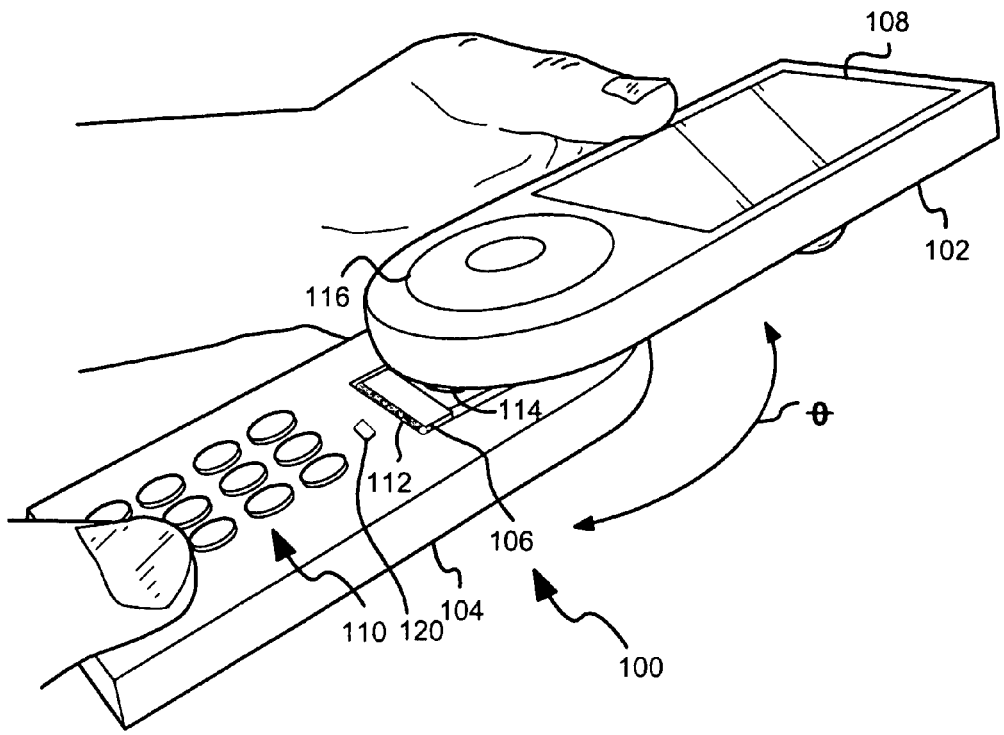
FIG. 1 shows an integrated computing wireless communication device in accordance with an embodiment of the present invention.

FIG. 1 generally illustrates an integrated computing wireless communication device 100 in accordance with an embodiment of the present invention. The integrated computing wireless communication device 100 includes an information input/output device 102, a wireless communication device 104, and a universal joint 106. The information input/output device 102 includes at least one input device 116 for inputting information and an output device 108 for presenting output. The wireless communication device 104 includes at least one input device 120 and an information-processing module (not shown) for implementing mobile computing features in the integrated computing wireless communication device 100. In accordance with an embodiment, the information-processing module is located internal to the wireless communication device 104. The information-processing module contains the logic, RAM, programs, and other software responsible for executing operations requested by the information input/output device 102. With this embodiment, the top portion, which, in accordance with an embodiment, is the information input/output device 102, would only serve as a display. Additionally, an additional ROM to include application executables that would take advantage of the display might be included in the information input/output device 102, thereby eliminating any sync issues between the two bodies. In an alternative embodiment, the information input/output device 102 houses the information-processing module. In accordance with one embodiment, the wireless communication device uses the output device 108 of the information input/output device 102. In other embodiments, the wireless communication device might have a separate output device, such as a separate display or a speaker.

In one embodiment, the information input/output device 102 has a display as the output device 108 and an input device 116. The display 108 might be a liquid crystal display (LCD), a light emitting diode display (LED), a dot matrix display, or any other display for presenting output. In one embodiment, the input device 116 inputs information into a graphical user interface. The graphical user interface is installed under an operating system, such as "Windows CE"®, installed on the information-processing module. The input device 116 is used for inputting information into the integrated computing wireless communication device 100 by the user and might be a stylus, a touchpad, a mouse, a joystick, or any other input device operating on a graphical user interface. In other embodiments, the input device 116 might input information into the integrated computing wireless communication device 100 through a command line interface. While a number of embodiments have been identified for the input device 116, any number of combinations of pads, keys, buttons, and posts might be selected to implement the input device 116.

In an alternative embodiment, the information input/output device 102 might be replaced by a mobile computing device. According to one embodiment of the alternative embodiment, the mobile computing device (such as 102) might be a personal data assistant (PDA) having a display (such as 108), an input device (such as 116), a processor operating the PDA, and a separate power supply. Under the alternative embodiment, the PDA may be detached from the wireless communication device and used as an independent device. The battery might still be charged through electrical contacts on the universal joint. In other alternative embodiments, the information input/output device might be replaced by other mobile computing devices having a processor, such as a handheld personal computer, an electronic organizer, a remote control operating any variety of devices or appliances, or any device wherein information is input by a user and used by a device to output functionality. In accordance with these embodiments, the information-processing module is part of the mobile communication device.

In one embodiment, the wireless communication device 104 is a cellular telephone having a numeric keypad 110 and a separate output (not shown), typically a speaker. In another embodiment, the wireless communication device might also include a display (not shown) providing associated communication functionality to the wireless communication device 104. For example, the display might present a listing of phone numbers or email addresses saved in the cellular phone. The numeric keypad 110 is an input device (such as 120) for inputting information into the cellular phone 104. While the description of the cellular telephone 104 concentrates on the keypad 110 for inputting information, any number of combinations of pads, keys, buttons, and posts might be selected as an alternative or addition to the keypad 110. In other embodiments, the wireless communication device might be an electronic mail receiver/transmitter, an electronic pager, an electronic messenger, or any other device for receiving and transmitting communication signals.

Figure 2:
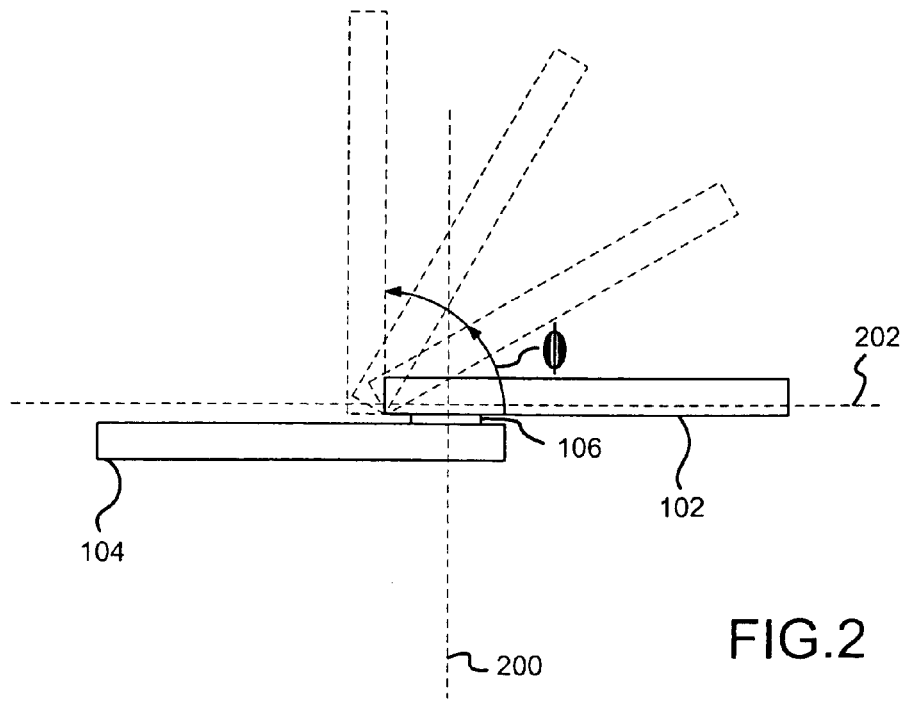
FIG. 2 illustrates rotation angles of the universal joint of the integrated computing wireless communication device of FIG. 1.

The universal joint 106 physically connects the wireless communication device 104 to the information input/output device 102. In one embodiment, the universal joint includes a swivel 112 and a pivot 114. The pivot 114 allows a full range of rotation along a vertical axis. The angle of rotation of the pivot 114 is represented in FIG. 1 as angle θ. FIG. 2 illustrates the vertical axis 200 upon which either device, the information input/output device 102 or the wireless communication device 104 rotate with respect to the other. Referring to FIG. 2, a 90 degree rotation of the information input/output device over the wireless communication device 104 is shown. Referring back to FIG. 1, the angle θ might be a full range of motion from 0 degrees to 360 degrees. If the angle θ is 0 or 360 degrees, then the information input/output device 102 is positioned over the wireless communication device 104.

The swivel 112 allows for a limited range of tilt along a horizontal axis 202 (FIG. 2). The angle of rotation of the swivel is represented in FIG. 2 as angle φ. Referring to FIG. 2, the integrated computing wireless communication device 100 is shown having an angle φ of 0 degrees, an angle φ of approximately 30 degrees, an angle φ of approximately 60 degrees, and an angle φ of approximately 90 degrees. In one embodiment, each angle φ is measured with the wireless communication device 104 being the reference angle 0 degrees and the information input/output device 102 being the position reference. In one embodiment, the angle φ might be any angle from approximately 0 degrees to approximately 180 degrees. In other embodiments, the angle φ might be any angle within the range of 0 degrees to 360 degrees; however, in order to implement such a range, the positioning of the swivel 112 must be positioned at the ends of both devices 102 and 104. Illustrations of the operation of the swivel 112 are provided in FIGS. 5 and 6.

In accordance with an embodiment, the universal joint 106 also has electrical contacts electrically connecting the information input/output device 102 and the wireless communication device 104. Through the electrical connection, the two devices may operate from the same power supply and may be charged through the same electrical connection. Additionally, through the electrical connection of the universal joint, the mobile computing device (such as 102) and the wireless communication device 104 of the alternative embodiment are enabled to transmit and receive information without the use of Bluetooth™ or other wireless technology.

Figure 3:
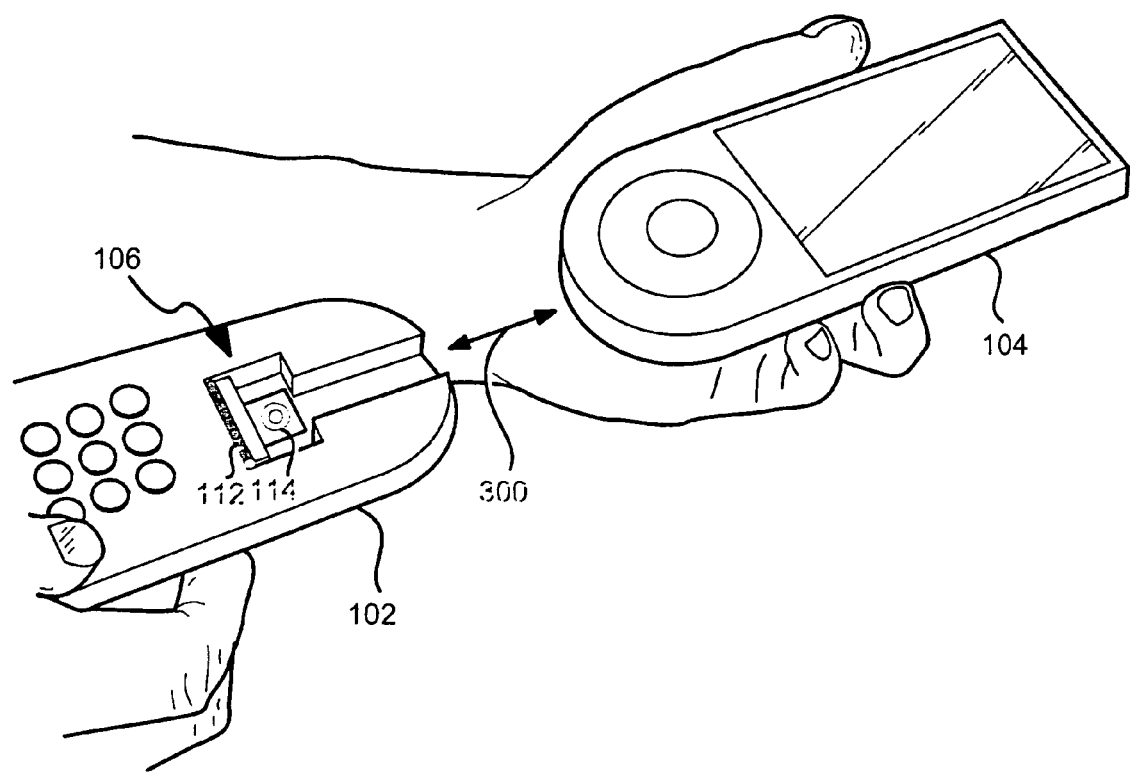
FIG. 3 illustrates operation of the connection of the universal joint in accordance with an embodiment of the present invention.

FIG. 3 illustrates operation of the connection of the universal joint 106 in accordance with one embodiment of the present invention. Whereas FIG. 1 illustrated the two devices 102 and 104 connected at the universal joint 106, FIG. 2 shows the information input/output device 102 and the wireless communication device 104 detached from one another. Connection line 300 illustrates the ability of the two devices 102 and 104 to attach at the universal joint 106.

In the alternative embodiment, both the mobile computing device (such as 102) and the wireless communication device 104 provide independent functionality to a user when detached from one another, meaning that both devices can be operated with absolutely no dependency upon the other device. Additionally, if the mobile computing device 102 and the wireless communication device 104 are within the FCC permitted range (currently 30 feet) allocated for Bluetooth™ technology, then the two devices 102 and 104 might pass, or transmit and receive, information through a Bluetooth™ wireless link.

Figure 4A:
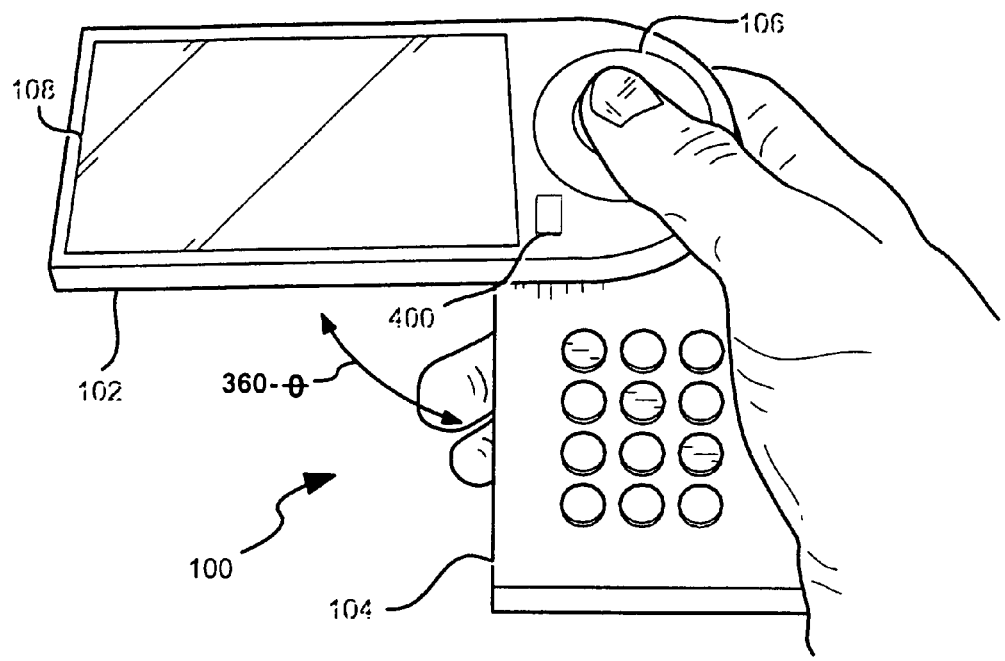
FIG. 4A illustrates right-hand orientation of the integrated computing wireless communication device for single-hand use by a user.
Figure 4B:
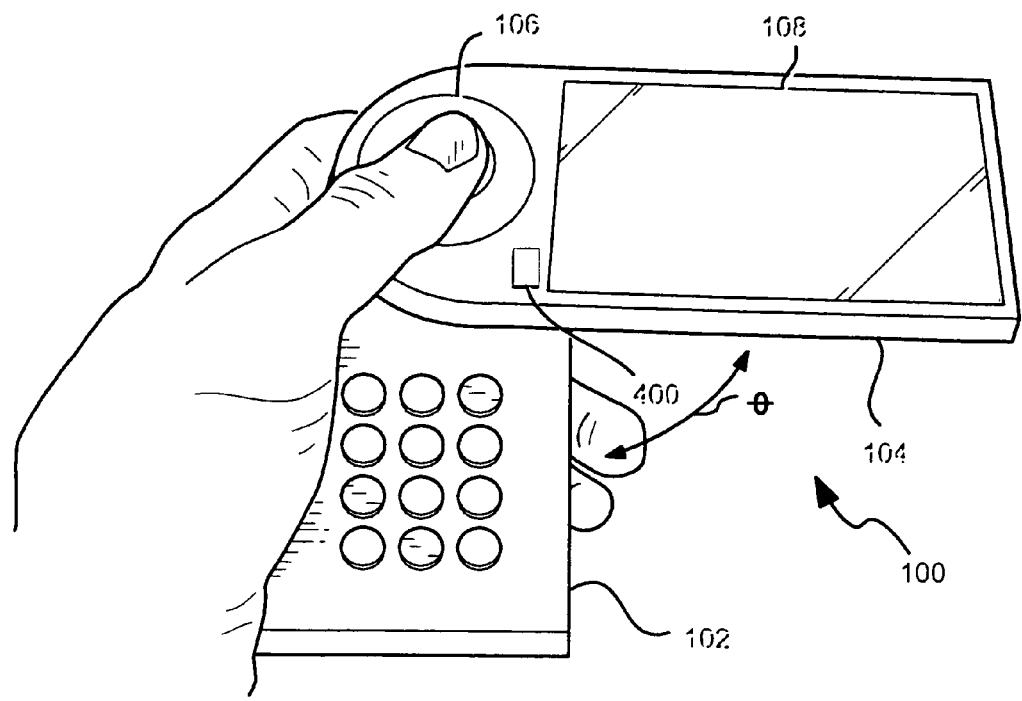
FIG. 4B illustrates left-hand orientation of the integrated computing wireless communication device for single-hand use by a user.

FIGS. 4A and 4B illustrate opposite orientations of the integrated computing wireless communication device 100 for single-hand use by a user. Referring to FIGS. 4A and 4B, the illustrations depict the wireless communication device 104 as a cellular phone. FIG. 4A illustrates the integrated computing wireless communication device 100 adapted for right-hand use by a user. In particular, angle θ is shown at 270 degrees from reference angle 0 degrees assigned to the position of the cellular phone 104. In one embodiment, universal joint 106 includes a latch (not shown) locking the information input/output device 102 in the position shown. By providing the capability to rotate the information input/output device 102 two hundred seventy degrees from the cellular phone 104, single-hand operation of the information input/output device 102 is facilitated. Obviously, this capability is only provided when the input device 116 on the information input/output device 102 also facilitates single-hand operation, such as a touchpad. FIG. 4B illustrates the integrated computing wireless communication device 100 as adapted for left-hand use by a user. Whereas the adaptation for right-hand use illustrated in FIG. 4A included an angle θ of 270 degrees, the integrated computing wireless communication device 100 illustrated in FIG. 4B has an angle θ of 90 degrees. Additionally, the output image on the display of the information input/output device 102 is rotated 180 degrees such that the user realizes the same orientation on the display 108 as the orientation associated with the right-hand use adaptation of FIG. 4A. As with the integrated computing wireless communication device 100 of FIG. 4A, the device 100 of FIG. 4B might contain a latch locking the information input/output device 102 in the position shown.

In accordance with an embodiment, orientation of the output image is adapted to the display 108 when the angle θ is equal to 270 degrees, 180 degrees, and 90 degrees. When angle θ is 180 degrees, the output image on the display 108 has a portrait orientation. When angle θ is 270 and 90 degrees, the output image on the display 108 has a landscape orientation. In accordance with alternative embodiments, rotation of the output image might be accomplished through either an input selection element 400 or the input device 116. In one embodiment, the input selection element 400 might be located on the information input/output device 102. In other embodiments, the input selection element 400 might be positioned on the mobile computing device. In yet other embodiments, the input selection element 400 might be operably connected to the universal joint 106 such that rotation of either body 102, 104 activate the selection element 400. For example, the universal joint 106 latched at 90 degrees triggers the input device 400 to transmit a signal to a graphical user interface requesting rotation of the output image 180 degrees from the orientation realized when the pivot 114 is latched at 270 degrees. Similarly, the universal joint 106 latched at 180 degrees triggers the input device 400 to transmit a signal to a graphical user interface requesting rotation of the output image 90 degrees from the orientation realized when the pivot 114 is latched at 270 degrees. In one embodiment, the graphical user interface is installed under the processor located in the wireless communication device 104. In the alternative embodiment, the graphical user interface is installed under the processor of the mobile computing device.

Figure 5:
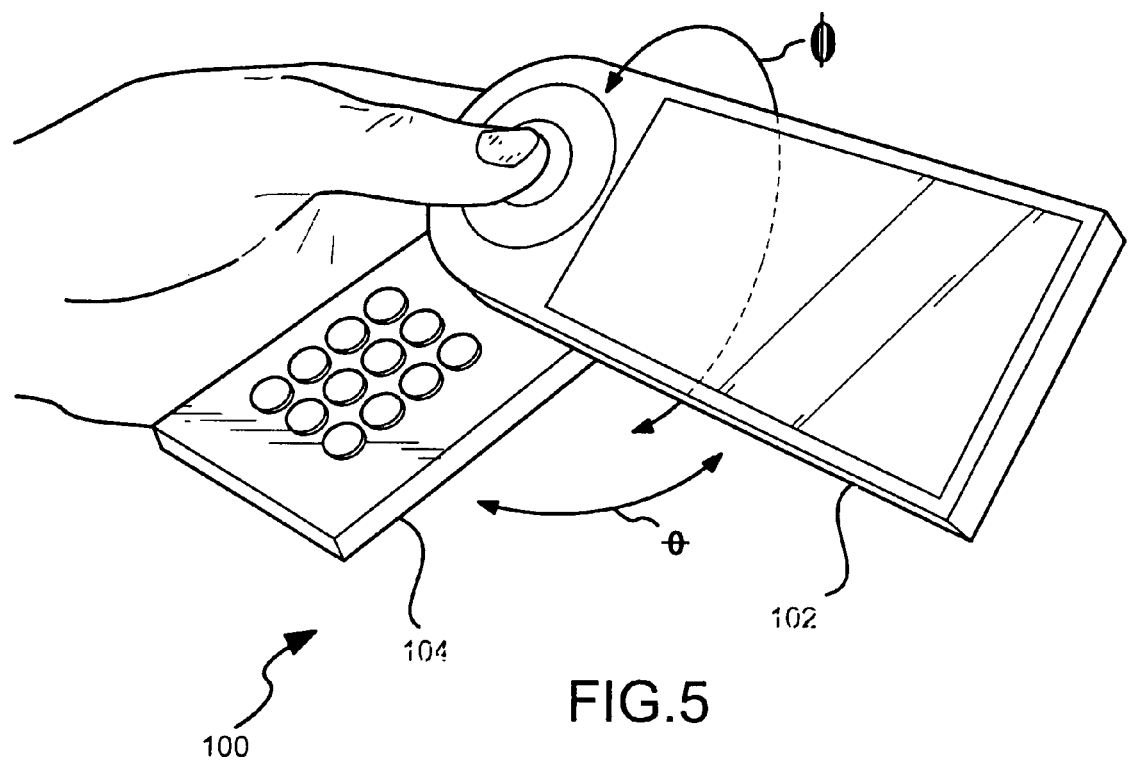
FIG. 5 illustrates concurrent operation of the swivel and the pivot of the universal joint of FIG. 1.

FIG. 5 illustrates concurrent operation of the swivel 112 and the pivot 114 as the integrated computing wireless communication device 100 is shown adapted for single-hand use. Referring to FIG. 5, the information input/output device 102 has an angle $\phi$ between 0 and 90 degrees and an angle $\theta$ of 90 degrees. As noted in FIG. 1, the angle $\theta$ may be varied between 0 and 360 degrees. By positioning the information input/output device 102 at the angle $\phi$ and angle $\theta$ of FIG. 5, the display 108 may be adapted for facilitated viewing by a user. As described in FIG. 4B, positioning the integrated computing wireless communication device 100 at angle $\theta$ adapts the device 100 for left-hand use.

Figure 6:
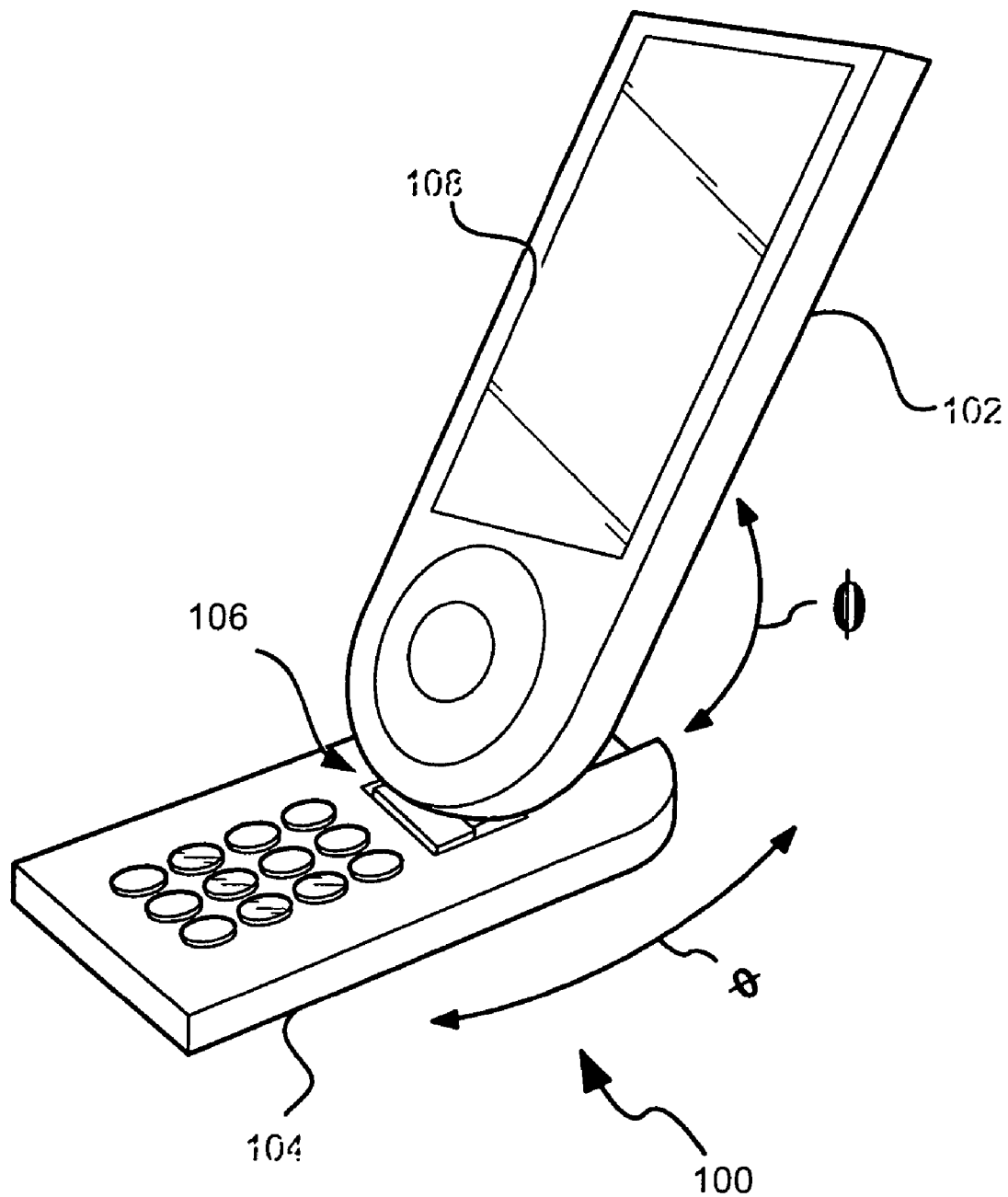
FIG. 6 further illustrates concurrent operation of the swivel and the pivot by showing the integrated computing wireless communication device positioned for upright information input and output into the information input/output device.

FIG. 6 further illustrates concurrent operation of the swivel 112 and the pivot 114 by showing the integrated computing wireless communication device 100 positioned for upright information input and output into the information input/output device 102. Referring to FIG. 6, the information input/output device 102 has an angle $\phi$ between 0 and 90 degrees and an angle $\theta$ of 180 degrees. By positioning the information input/output device 102 at the angle $\phi$ and angle $\theta$ of FIG. 6, the integrated computing wireless communication device 100 is adapted to stand upright on a flat surface thereby allowing a user to use the device 100 similar to implementations employed by conventional desktop computers.

It will be clear that the integrated computing wireless communication apparatus 100 is well adapted to attain the ends and advantages mentioned as well as those inherent therein. While a presently preferred embodiment has been described for purposes of this disclosure, various changes and modifications may be made which are well within the scope of the present invention. For example, the integrated computing wireless communication apparatus 100 might contain an additional plug, or input terminal, for connecting any number of peripheral input devices to the integrated computing wireless communication apparatus 100. In one embodiment, such a peripheral device might be a keyboard. In other embodiments, the peripheral device might be a joystick, a mouse, or any other input device capable of being attached to input information into the integrated computing wireless communication apparatus 100. Additionally, the integrated computing wireless communication apparatus 100 may contain a trigger providing functionality to activate the display 108 or various output images on the display 108.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. An apparatus for movably attaching a handheld first electronic device to a handheld second electronic device, the apparatus comprising:
   a universal joint configured to rotatably attach the first electronic device to the second electronic device, wherein the universal joint is configured to accommodate rotation of the first electronic device about two axes relative to the second electronic device, and wherein the universal joint is further configured to allow separation of the first electronic device from the second electronic device such that each device may be used independently of the other device.

2. The apparatus of claim 1 wherein, when the first electronic device is connected to the second electronic device via the universal joint, the first electronic device interacts with the second electronic device to integrate features of the first electronic device with features of the second electronic device.

3. The apparatus of claim 1 wherein the first electronic device includes a handheld information input/output device and the second electronic device includes a handheld wireless communication device, and wherein the universal joint is configured to rotatably attach the information input/output device to the wireless communication device.

4. The apparatus of claim 1 wherein the first electronic device includes a handheld information input/output device and the second electronic device includes a handheld wireless communication device having an information processing module, and wherein, when the information input/output device is connected to the wireless communication device via the universal joint, the information input/output device interacts with the information processing module to integrate mobile computing features with the wireless communication device.

5. The apparatus of claim 1 wherein, when the first electronic device is connected to the second electronic device via the universal joint, the universal joint latches in at least one position allowing a user to hold both devices in one hand and input information into at least one of the two devices with the same hand.

6. The apparatus of claim 1 wherein the universal joint further includes a swivel configured to allow normal rotation of the first electronic device relative to the second electronic device about a horizontal axis.

7. The apparatus of claim 1 wherein the universal joint further includes a pivot configured to allow tangential rotation of the first electronic device relative to the second electronic device about a vertical axis.

8. A modular apparatus comprising:
   an information input/output device;
   a wireless communication device having an information processing module; and
   a universal joint with mechanical latch positions rotatably attaching the information input/output device to the wireless communication device, wherein the universal joint accommodates rotation of the information input/output device about two axes relative to the wireless communication device, and wherein the universal joint allows separation of the information input/output device from the wireless communication device such that each device may be used independently of the other device.

9. The modular apparatus of claim 8 wherein the information input/output device comprises:
   an input device inputting information into the information processing module; and a display presenting output processed from the information processing module,
wherein an orientation of the output is adapted based upon a position of the display relative to the wireless communication device.

10. The modular apparatus of claim 8 wherein the universal joint latches in at least one position allowing a user to hold both devices with one hand and input information with the same hand.

11. The modular apparatus of claim 8 wherein the universal joint includes at least one electrical contact electrically connecting the information input/output device to the wireless communication device.

12. The modular apparatus of claim 8 wherein the universal joint includes a swivel, and wherein the swivel latches in at least one position fastening the information input/output device in a relative position to the wireless communication device to allow the modular apparatus to stand on a surface of the wireless communication device, thereby allowing a user to position the modular apparatus on a flat surface for viewing the display.

13. A handheld apparatus comprising:
a first electronic device;
a second electronic device; and
a universal joint with mechanical latch positions rotatably connecting the first electronic device to the second electronic device, wherein the universal joint accommodates rotation of the first electronic device about two axes relative to the second electronic device, and wherein the universal joint allows separation of the first electronic device from the second electronic device such that each device may be used independently of the other device.

14. The handheld apparatus of claim 13 wherein the first electronic device includes at least one of a handheld mobile computing device and a handheld wireless communication device.

15. The handheld apparatus of claim 13 further comprising a wireless link transmitting and receiving information between the first electronic device and the second electronic device while the devices are not connected by the universal joint.

16. The handheld apparatus of claim 13 wherein the universal joint further includes at least one electrical contact electrically connecting the first electronic device to the second electronic device.

17. The handheld apparatus of claim 13 wherein the first electronic device includes a graphical user interface providing interaction between the user and the device through an input device.

18. The handheld apparatus of claim 13 wherein the universal joint latches in at least one position fastening the first electronic device to the second electronic device in a relative position to allow a user to hold with one hand both devices and input information with the same hand.

19. The handheld apparatus of claim 13 wherein the first electronic device includes a display that presents an output image having an orientation based upon a position of the display relative to the first electronic device.

20. The handheld apparatus of claim 13 wherein the first electronic device includes a display that presents an output image having an orientation based upon a position of the display relative to the second electronic device.

* * * * *